(12) United States Patent
Chen

(10) Patent No.: US 7,287,894 B2
(45) Date of Patent: Oct. 30, 2007

(54) LIGHT GUIDE PLATE WITH MESO-NANO PORE STRUCTURE

(75) Inventor: Ga-Lane Chen, Fremont, CA (US)

(73) Assignee: Hon Hai Precision Industry Co., Ltd., Tu-Cheng City, Taipei Hsien (TW)

( * ) Notice: Subject to any disclaimer, the term of this patent is extended or adjusted under 35 U.S.C. 154(b) by 84 days.

(21) Appl. No.: 11/179,188

(22) Filed: Jul. 12, 2005

(65) Prior Publication Data
US 2006/0013018 A1    Jan. 19, 2006

(30) Foreign Application Priority Data
Jul. 16, 2004    (TW) ............................. 93121315 A

(51) Int. Cl.
F21V 7/04    (2006.01)
G02B 6/10    (2006.01)
F21V 7/05    (2006.01)

(52) U.S. Cl. ...................... 362/621; 362/615; 362/623; 385/129

(58) Field of Classification Search ................ 362/619, 362/606, 617, 625, 326, 327, 332, 297, 311, 362/600, 615, 621, 623; 977/773, 952; 385/146, 385/129
See application file for complete search history.

(56) References Cited

U.S. PATENT DOCUMENTS

| | | | | |
|---|---|---|---|---|
| 5,706,134 A | * | 1/1998 | Konno et al. ............... | 359/599 |
| 5,944,994 A | * | 8/1999 | Asher et al. ............ | 210/500.22 |
| 6,233,095 B1 | * | 5/2001 | Niwa et al. .................. | 359/443 |
| 6,596,375 B2 | * | 7/2003 | Murata et al. .............. | 428/144 |
| 6,602,596 B2 | * | 8/2003 | Kimura et al. .............. | 428/327 |
| 6,709,143 B2 | * | 3/2004 | Harada et al. .............. | 362/558 |
| 6,741,303 B1 | * | 5/2004 | Okabe ......................... | 349/65 |
| 6,744,960 B2 | * | 6/2004 | Pelka .......................... | 385/130 |
| 6,825,984 B2 | * | 11/2004 | Kashima et al. ............ | 359/599 |
| 6,871,994 B2 | * | 3/2005 | Harada et al. .............. | 362/558 |
| 7,039,286 B2 | * | 5/2006 | Leu et al. .................... | 385/129 |
| 2001/0050736 A1 | * | 12/2001 | Lee et al. ...................... | 349/65 |

* cited by examiner

*Primary Examiner*—Jong-Suk (James) Lee
*Assistant Examiner*—David R Crowe
(74) *Attorney, Agent, or Firm*—Morris Manning Martin LLP; Tim Tingkang Xia, Esq.

(57) ABSTRACT

A light guide plate (20) includes a light incident surface (21) having a meso-nano pore structure (210) formed thereat, a bottom surface (22) adjacent to the incident surface. The meso-nano pore structure includes a plurality of meso-nano pores (211) which are less than 50 nm in size, a plurality of first meso-nano particles (212) disposed in the meso-nano pores, and a plurality of second meso-nano particles (213) disposed generally between the meso-nano pores. The meso-nano pores are considerably less than a wavelength (400~700 nm) of visible light in size, so that a nano-coupling effect occurs between photons of the lightbeams. Therefore, light loss caused by scattering is reduced, and a rate of utilization of light is improved.

19 Claims, 3 Drawing Sheets

LIGHT GUIDE PLATE WITH MESO-NANO PORE STRUCTURE

BACKGROUND

1. Field of the Invention

The present invention relates to light guide plates used in products such as liquid crystal displays.

2. General Background

A typical LCD device comprises an LCD panel, and a backlight system mounted under the LCD panel for supplying light beams thereto. There are two types of backlight systems: the edge type and the direct type. The edge type backlight system mainly comprises a light guide plate, and a light source disposed adjacent to a thin side of the light guide plate. The light guide plate is used for guiding the light beams emitted by the light source, in order to uniformly illuminate the LCD panel. In contrast, the direct type backlight system employs light sources placed in an air-filled cavity under the LCD panel, and a diffuser disposed between the LCD panel and the light sources.

Referring to FIG. 6, a light guide plate 10 comprises a light incident surface 101, a light emitting surface 102 adjacent to the incident surface 101, and a bottom surface 103 opposite to the emitting surface 102. A plurality of v-shape cuts 11 are formed at the bottom surface 103. The cuts 11 are uniform, and define triangular cross-sections. The cuts 11 are oriented parallel to the incident surface 101.

FIG. 7 is a side view of the light guide plate 10 shown in FIG. 6, showing essential light paths. Incident light beams enter the light guide plate 10 through the incident surface 101. The v-shape cuts 11 can scatter and reflect the light beams, so as to totally eliminate internal reflection of the light beams and make the light beams evenly emit from the emitting surface 102. An angle of each of the cuts 11 can configured in order to appropriately direct the light beams reaching the cuts 11. Thus a range of emission of light from the light guide plate 10 is controllable.

However, all the cuts 11 are parallel to each other. That is, the cuts 11 are arranged along a single direction. The cuts 11 cannot eliminate internal reflection of all light beams, and portions of the light beams are wasted. Therefore, the light guide plate 10 may have low brightness and low utilization of light.

What is needed, therefore, is a light guide plate having high brightness and high utilization of light.

SUMMARY

In a preferred embodiment of the present invention, a light guide plate includes a light incident surface having a meso-nano pore structure formed thereat, a bottom surface adjacent to the incident surface, and a light emitting surface opposite to the bottom surface. The meso-nano pore structure includes a plurality of meso-nano pores, a plurality of first meso-nano particles disposed in the meso-nano pores, and a plurality of second meso-nano particles disposed generally between the meso-nano pores. The meso-nano pores are considerably less than 50 nm in size.

The meso-nano pores are considerably less than a wavelength (400~700 nm) of visible light in size, so that a nano-coupling effect occurs between photons of incident light beams. Therefore, light loss caused by scattering is reduced, and a rate of utilization of light is improved.

Other advantages and novel features of embodiments of the present invention will become more apparent from the following detailed description when taken in conjunction with the accompanying drawings, in which:

DETAILED DESCRIPTION OF PREFERRED EMBODIMENTS

Reference will now be made to the drawings to describe embodiments of the present invention in detail.

Figure 1:
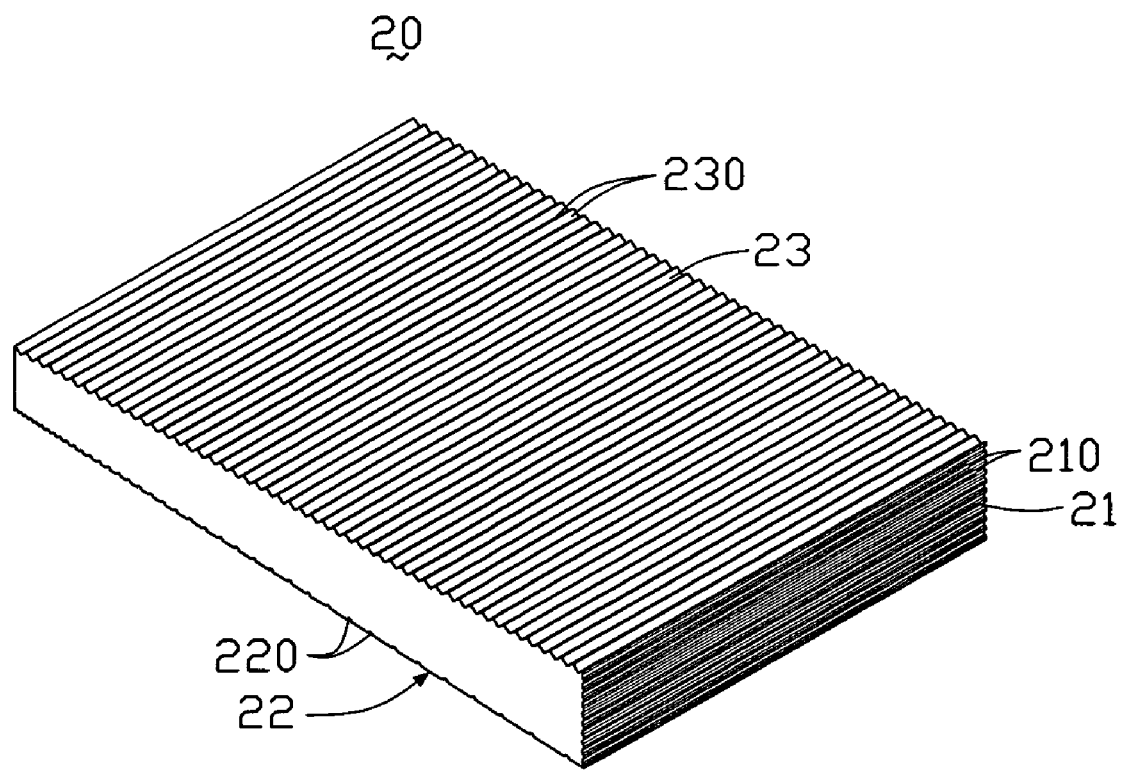
FIG. 1 is an isometric view of a light guide plate of a preferred embodiment of the present invention.
Figure 2:
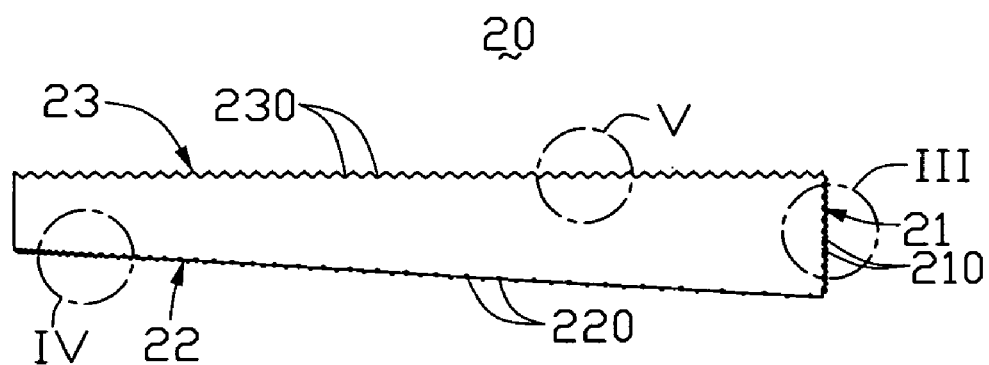
FIG. 2 is a side view of the light guide plate of FIG. 1.

Referring to FIGS. 1 and 2, a plate-like light guide member 20 for a backlight system of a liquid crystal display (LCD) device of a preferred embodiment of the present invention includes a light incident surface 21, a bottom surface 22 adjacent to the incident surface 21, and a light emitting surface 23 opposite to the bottom surface 22. A first meso-nano pore structure 210 for light treatment is located on the incident surface 21, and a second meso-nano pore structure 220 for light treatment is located on the bottom surface 22. A plurality of v-shape cuts 230 are formed at the emitting surface 23.

Figure 3:
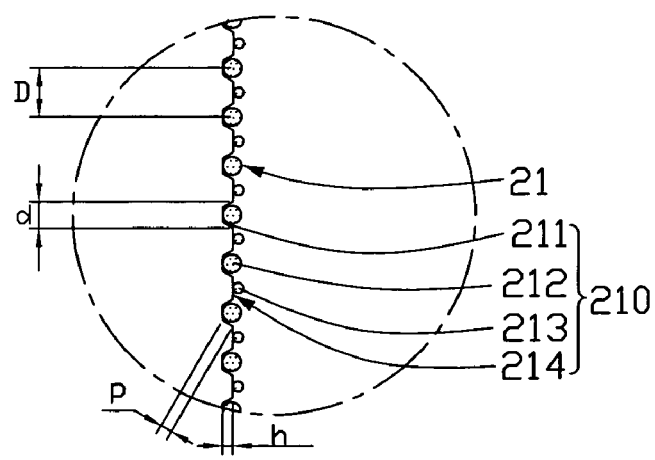
FIG. 3 is an enlarged view of a circled portion III of FIG. 2.

FIG. 3 is an enlarged view of the first meso-nano pore structure 210. The first meso-nano pore structure 210 includes a plurality of first meso-nano pores 211, a plurality of first meso-nano particles 212, and a plurality of second meso-nano particles 213. A cross-section of the light incident surface 21 at each first meso-nano pore 211 may define an isosceles trapezoid. A length d of a longer of two parallel sides of the isosceles trapezoid may be in the range from 2~50 nm, and preferably in the range from 20~50 nm. A length p of each of two nonparallel sides of the isosceles trapezoid may be in the range from 5~40 nm. A depth h of the isosceles trapezoid may be in the range from 5~20 nm. The first meso-nano particles 212 are arranged in the first meso-nano pores 211. A first space 214 is defined between each two adjacent first meso-nano particles 212. A pitch D is defined between each two adjacent first meso-nano particles 212. The pitch D may for example be 50 nm. The second meso-nano particles 213 are arranged in the first spaces 214. Therefore, the first and second meso-nano particles 212, 213 are staggered from each other along the light incident surface 21 and planes perpendicular to the light incident surface 21. The first and second meso-nano particles 212, 213 may be made of $SiO_2$ (silicon dioxide). The first meso-nano particles 212 have a diameter which may be in the range from 1~40 nm, the diameter being larger than a diameter of the second meso-nano particles 213.

The first meso-nano pores 211 do not exceed 50 nm in size; that is, they are considerably less than a wavelength (400~700 nm) of visible light. When light beams pass through the incident surface 21, a nano-coupling effect occurs between photons of the light beams in the meso-nano range (2~50 nm). Consequently, light loss caused by scattering is reduced, and a rate of utilization of light is improved.

Figure 4:
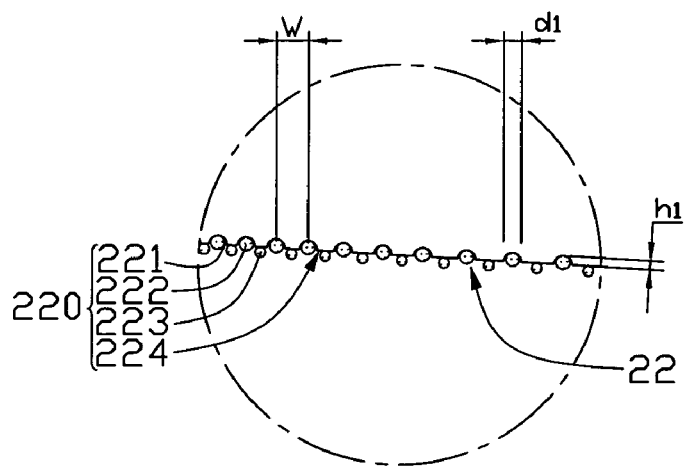
FIG. 4 is an enlarged view of a circled portion IV of FIG. 2.

FIG. 4 is an enlarged view of the second meso-nano pore structure 220. The second meso-nano pore structure 220 includes a plurality of second meso-nano pores 221, a plurality of third meso-nano particles 222, and a plurality of fourth meso-nano particles 223. A cross-section of the bottom surface 22 at each second meso-nano pore 221 is an arc. A pitch w between any two adjacent second meso-nano pores 221 is less than 50 nm, and progressively decreases with increasing distance away from the incident surface 21. A width $d_1$ of each second meso-nano pore 221 is in the range from 5~20 nm. A height $h_1$ of each second meso-nano pore 221 is in the range from 5~20 nm. The third meso-nano particles 222 are arranged in the second meso-nano pores 221. A second space 224 is defined between each two adjacent third meso-nano particles 222. The fourth meso-nano particles 223 are arranged in the second spaces 224. Therefore, the third and fourth meso-nano particles 222, 223 are staggered from each other along the bottom surface 22 and planes perpendicular to the bottom surface 22. The third and fourth meso-nano particles 222, 223 may be made of $SiO_2$. The third meso-nano particles 222 have a diameter in the range from 1~40 nm, the diameter being larger than a diameter of the fourth meso-nano particles 223.

The second meso-nano pore structure 220 can enable light beams arriving at the bottom surface 22 to be scattered and diffracted many times; that is, a nano-coupling effect between photons of the light beams occurs.

Figure 5:
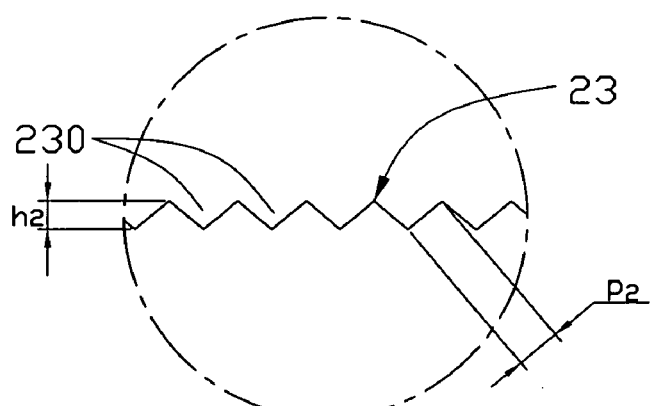
FIG. 5 is an enlarged view of a circled portion V of FIG. 2.
Figure 6:
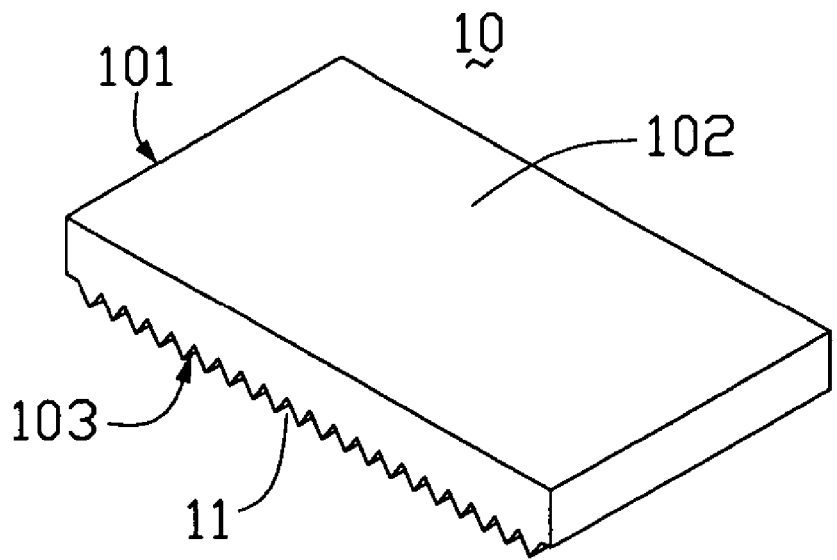
FIG. 6 is an isometric view of a conventional light guide plate.
Figure 7:
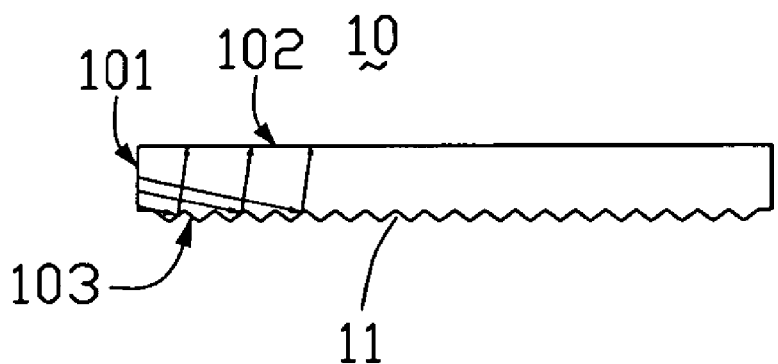
FIG. 7 is a side view of the light guide plate of FIG. 6, showing essential light paths thereof.

FIG. 5 is an enlarged view of some of the v-shape cuts 230. A length $p_2$ of an oblique line of the "v" is in the range from 5~50 μm, and preferably in the range from 10~20 μm. A height $h_2$ of the "v" is in the range from 2~25 μm, and preferably in the range from 5~10 μm. A bottom angle of the "v" is in the range from 90°~120°, and preferably in the range from 100°~110°.

The first and second meso-nano pores 211, 221 are both sized considerably less than a wavelength (400~700 nm) of visible light, so that a nano-coupling effect occurs between photons of light beams. Therefore, light loss caused by scattering is reduced, and a utilization rate of light is improved. The v-shape cuts 230 can make light beams that are emitted from the emitting surface 23 more uniform.

The present invention may have further alternative embodiments as follows. The cross-section of the incident surface 21 at each first meso-nano pore 211 may define a rectangle, a semicircle, or a "v" shape. The cross-section of the bottom surface 22 at each second meso-nano pore 221 may define an isosceles trapezoid, a rectangle, a semicircle, or a "v" shape.

It is to be further understood that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A light guide plate comprising:
a light incident surface having a first meso-nano pore structure formed thereat, the first meso-nano pore structure comprising a plurality of first meso-nano pores recessed into the light guide plate from the light incident surface, a plurality of first meso-nano particles disposed in the first meso-nano pores, a plurality of second meso-nano particles disposed on the light incident surface generally between the first meso-nano pores; and
a bottom surface adjacent to the incident surface.

2. The light guide plate as claimed in claim 1, wherein the first meso-nano pores are less than 50 nm in size.

3. The light guide plate as claimed in claim 1, wherein the first meso-nano particles are in the range from 1~40 nm in size, and are larger than the second meso-nano particles.

4. The light guide plate as claimed in claim 1, wherein a cross-section of the incident surface at each first meso-nano pore defines an isosceles trapezoid.

5. The light guide plate as claimed in claim 4, wherein a length of a longer of two parallel sides of the isosceles trapezoid is in the range from 2~50 nm.

6. The light guide plate as claimed in claim 5, wherein the length of the longer of the two parallel sides of the isosceles trapezoid is in the range from 20~50 nm.

7. The light guide plate as claimed in claim 4, wherein a length of a nonparallel side of the isosceles trapezoid is in the range from 5~40 nm.

8. The light guide plate as claimed in claim 4, wherein a depth of the isosceles trapezoid is in the range from 5~20 nm.

9. The light guide plate as claimed in claim 1, further comprising a light emitting surface opposite to the bottom surface, the emitting surface having a plurality of v-shape cuts thereat.

10. The light guide plate as claimed in claim 9, wherein a length of an oblique line of each v-shape cut is in the range from 5~50 μm.

11. The light guide plate as claimed in claim 10, wherein the length of the oblique line of each v-shape cut is in the range from 10~20 μm.

12. The light guide plate as claimed in claim 9, wherein a height of each v-shape cut is in the range from 2~25 μm.

13. The light guide plate as claimed in claim 12, wherein the height of each v-shape cut is in the range from 5~10 μm.

14. The light guide plate as claimed in claim 9, wherein an angle of each v-shape cut is in the range from 90°~120°.

15. The light guide plate as claimed in claim 14, wherein the angle of each v-shape cut is in the range from 100°~110°.

16. The light guide plate as claimed in claim 1, wherein the bottom surface has a second meso-nano pore structure formed thereat, and the second meso-nano pore structure comprises a plurality of second meso-nano pores, a plurality of third meso-nano particles disposed in the second meso-nano pores, and a plurality of fourth meso-nano particles disposed generally between the second meso-nano pores.

17. The light guide plate as claimed in claim 16, wherein a cross-section of the bottom surface at each second meso-nano pore defines an arc.

18. The light guide plate as claimed in claim 16, wherein a pitch between any two adjacent second meso-nano pores is less than 50 nm, and the pitch progressively decreases with increasing distance away from the incident surface.

19. A backlight system of a display device, comprising:
a light source providing light for said backlight system; and
a light guide member defining a light incident surface facing said light source to receive said light from said light source, a light emitting surface for emitting said light out of said light guide member, and a bottom surface defined opposite to said light emitting surface, a first meso-nano pore structure arranged at said light incident surface in a traveling path of said light through said light guide member, said first meso-nano pore structure having a plurality of first meso-nano pores orderly recessed in said light guide member along said light incident surface, a plurality of first meso-nano particles disposed in said plurality of first meso-nano pores, a plurality of second meso-nano particles disposed on said light incident surface generally between said plurality of first meso-nano pores, a second meso-nano pore structure formed at said bottom surface, and comprising a plurality of second meso-nano pores, a plurality of third meso-nano particles disposed in said plurality of second meso-nano pores, and a plurality of fourth meso-nano particles disposed on said bottom surface generally between said plurality of second meso-nano pores.

* * * * *